US011132818B2

(12) United States Patent
Mammou et al.

(10) Patent No.: US 11,132,818 B2
(45) Date of Patent: Sep. 28, 2021

(54) PREDICTING ATTRIBUTES FOR POINT CLOUD COMPRESSION ACCORDING TO A SPACE FILLING CURVE

(71) Applicant: Apple Inc., Cupertino, CA (US)

(72) Inventors: Khaled Mammou, Vancouver (CA); Alexandros Tourapis, Los Gatos, CA (US); Jungsun Kim, San Jose, CA (US); Valery G. Valentin, San Jose, CA (US); Fabrice A. Robinet, Sunnyvale, CA (US); Yeping Su, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 9 days.

(21) Appl. No.: 16/586,785

(22) Filed: Sep. 27, 2019

(65) Prior Publication Data

US 2021/0097722 A1    Apr. 1, 2021

Related U.S. Application Data

(60) Provisional application No. 62/739,083, filed on Sep. 28, 2018.

(51) Int. Cl.
   *G06T 9/00*    (2006.01)
(52) U.S. Cl.
   CPC ...................... *G06T 9/00* (2013.01)
(58) Field of Classification Search
   CPC ...................................................... G06T 9/00
   USPC ........................................................ 345/419
   See application file for complete search history.

(56) References Cited

U.S. PATENT DOCUMENTS

| 8,884,953 | B2 | 11/2014 | Chen et al. |
| 9,171,383 | B2 | 10/2015 | Ahn et al. |
| 9,787,321 | B1 | 10/2017 | Hemmer et al. |
| 10,762,667 | B2 | 9/2020 | Mekuria |
| 2016/0086353 | A1* | 3/2016 | Lukac ...................... G06T 9/00 345/419 |
| 2018/0268570 | A1 | 9/2018 | Budagavi et al. |

(Continued)

FOREIGN PATENT DOCUMENTS

CN            10230618       1/2012

OTHER PUBLICATIONS

Hao Liu, et al., "A Comprehensive Study and Comparison of Core Technologies for MPEG 3D Point Cloud Compression", arXiv:1912.09674v1, Dec. 20, 2019, pp. 1-17.

(Continued)

*Primary Examiner* — Shivang I Patel
(74) *Attorney, Agent, or Firm* — Robert C. Kowert; Kowert, Hood, Munyon, Rankin & Goetzel, P.C.

(57) ABSTRACT

Attributes for point cloud compression may be predicted according to a space filling curve. An order for selecting points of a point cloud to be compressed in order to predict attributes of the points may be determined according to values of a space filling curve applied to spatial information for the points. A point of the point cloud may be selected according to the determined ordering. A prediction technique may be performed with respect to the selected point based on a set of neighboring points in the point cloud also selected according to the ordering. Predicted attribute values and correction values may be determined for the predicted values. The correction values may be encoded as part of a compressed version of the point cloud.

20 Claims, 8 Drawing Sheets

(56) References Cited

U.S. PATENT DOCUMENTS

| | | | |
|---|---|---|---|
| 2019/0197739 A1 | 6/2019 | Sinharoy et al. | |
| 2019/0341930 A1* | 11/2019 | Pavlovic | G06T 9/001 |
| 2020/0005518 A1 | 1/2020 | Graziosi | |
| 2020/0153885 A1 | 5/2020 | Lee et al. | |
| 2020/0219285 A1 | 7/2020 | Faramarzi et al. | |
| 2020/0286261 A1 | 9/2020 | Faramarzi et al. | |
| 2020/0302578 A1 | 9/2020 | Graziosi | |

OTHER PUBLICATIONS

Styliani Psomadaki, "Using a Space Filing Curve for the Management of Dynamic Point Cloud Data in a Relational DBMS", Nov. 2016, pp. 1-158.

Sebastian Schwarz, et al., "Emerging MPEG Standards for Point Cloud Compression", IEEE Journal on Emerging and Selected Topics in Circuits and Systems, vol. 9, No. 1, Mar. 2019, pp. 133-148.

Li Li, et al., Efficient Projected Frame Padding for Video-based Point Cloud Compression, IEEE Transactions on Multimedia, doi: 10.100/TMM.2020.3016894, 2020, pp. 1-14.

Lujia Wang, et al., "Point-cloud Compression Using Data Independent Method—A 3D Discrete Cosine Transform Approach", in Proceedings of the 2017 IEEE International Conference on Information and Automation (ICIA), Jul. 2017, pp. 1-6.

Ismael Daribo, et al., "Efficient Rate-Distortion Compression on Dynamic Point Cloud for Grid-Pattern-Based 3D Scanning Systems", 3D Research 3.1, Springer, 2012, pp. 1-9.

Yiting Shao, et al., "Attribute Compression of 3D Point Clouds Using Laplacian Sparsity Optimized Graph Transform", 2017 IEEE Visual Communications and Image Processing (VCIP), IEEE, 2017, p. 1-4.

Siheng Chen, et al., "Fast Resampling of 3D Point Clouds via Graphs", arX1v:1702.06397v1, Feb. 11, 2017, pp. 1-15.

Nahid Sheikhi Pour, "Improvements for Projection-Based Point Cloud Compression", MS Thesis, 2018, pp. 1-75.

Robert Skupin, et al., "Multiview Point Cloud Filtering for Spatiotemporal Consistency", VISAPP 2014—International Conference on Computer Vision Theory and Applications, 2014, pp. 531-538.

* cited by examiner

PREDICTING ATTRIBUTES FOR POINT CLOUD COMPRESSION ACCORDING TO A SPACE FILLING CURVE

PRIORITY CLAIM

This application claims benefit of priority to U.S. Provisional Application Ser. No. 62/739,083, entitled "Predicting Attributes for Point Cloud Compression According to a Space Filling Curve", filed Sep. 28, 2018, and which is incorporated herein by reference in its entirety.

BACKGROUND

Technical Field

This disclosure relates generally to compression and decompression of point clouds comprising a plurality of points, each having associated attribute information.

Description of the Related Art

Various types of sensors, such as light detection and ranging (LIDAR) systems, 3-D-cameras, 3-D scanners, etc. may capture data indicating positions of points in three dimensional space, for example positions in the X, Y, and Z planes. Also, such systems may further capture attribute information in addition to spatial information for the respective points, such as color information (e.g. RGB values), intensity attributes, reflectivity attributes, motion related attributes, modality attributes, or various other attributes. In some circumstances, additional attributes may be assigned to the respective points, such as a time-stamp when the point was captured. Points captured by such sensors may make up a "point cloud" comprising a set of points each having associated spatial information and one or more associated attributes. In some circumstances, a point cloud may include thousands of points, hundreds of thousands of points, millions of points, or even more points. Also, in some circumstances, point clouds may be generated, for example in software, as opposed to being captured by one or more sensors. In either case, such point clouds may include large amounts of data and may be costly and time-consuming to store and transmit.

Figure 1:
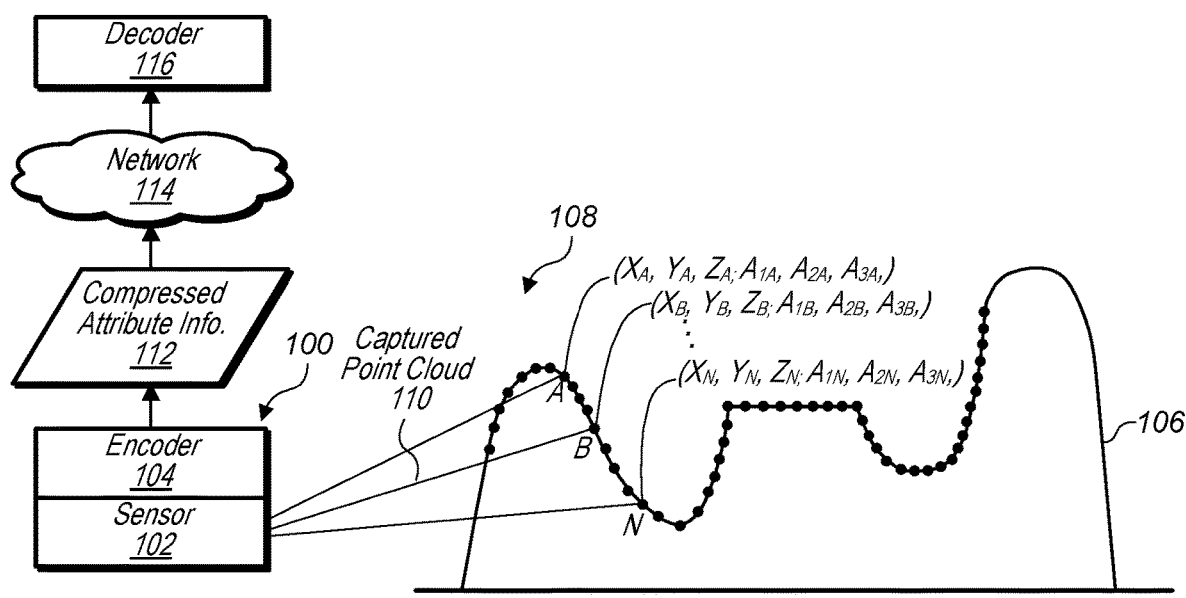
FIG. 1 illustrates a system comprising a sensor that captures information for points of a point cloud and an encoder that compresses attribute and/or spatial information of the point cloud, where the compressed attribute and/or spatial information is sent to a decoder, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture point clouds comprising thousands or millions of points in 2-D or 3-D space, such as via LIDAR systems, has increased. Also, the development of advanced display technologies, such as virtual reality or augmented reality systems, has increased potential uses for point clouds. However, point cloud files are often very large and may be costly and time-consuming to store and transmit. For example, communication of point clouds over private or public networks, such as the Internet, may require considerable amounts of time and/or network resources, such that some uses of point cloud data, such as real-time uses, may be limited. Also, storage requirements of point cloud files may consume a significant amount of storage capacity of devices storing the point cloud files, which may also limit potential applications for using point cloud data.

In some embodiments, an encoder may be used to generate a compressed point cloud to reduce costs and time associated with storing and transmitting large point cloud files. In some embodiments, a system may include an encoder that compresses attribute or spatial information of a point cloud file such that the point cloud file may be stored and transmitted more quickly than non-compressed point clouds and in a manner that the point cloud file may occupy less storage space than non-compressed point clouds. In some embodiments, compression of attributes of points in a point cloud may enable a point cloud to be communicated over a network in real-time or in near real-time. For example, a system may include a sensor that captures attribute information about points in an environment where the sensor is located, wherein the captured points and corresponding attributes make up a point cloud. The system may also include an encoder that compresses the captured point cloud attribute information. The compressed attribute information of the point cloud may be sent over a network in real-time or near real-time to a decoder that decompresses the compressed attribute information of the point cloud. The decompressed point cloud may be further processed, for example to make a control decision based on the surrounding environment at the location of the sensor. The control decision may then be communicated back to a device at or near the location of the sensor, wherein the device receiving the control decision implements the control decision in real-time or near real-time. In some embodiments, the decoder may be associated with an augmented reality system and the decompressed attribute information may be displayed or otherwise used by the augmented reality system. In some embodiments, compressed attribute information for a point cloud may be sent with compressed spatial information for points of the point cloud. In other embodiments, spatial information and attribute information may be separately encoded and/or separately transmitted to a decoder.

In some embodiments, a system may include a decoder that receives one or more point cloud files comprising compressed attribute information via a network from a remote server or other storage device that stores the one or more point cloud files. For example, a 3-D display, a holographic display, or a head-mounted display may be manipulated in real-time or near real-time to show different portions of a virtual world represented by point clouds. In order to update the 3-D display, the holographic display, or the head-mounted display, a system associated with the decoder may request point cloud files from the remote server based on user manipulations of the displays, and the point cloud files may be transmitted from the remote server to the decoder and decoded by the decoder in real-time or near real-time. The displays may then be updated with updated point cloud data responsive to the user manipulations, such as updated point attributes.

In some embodiments, a system, may include one or more LIDAR systems, 3-D cameras, 3-D scanners, etc., and such sensor devices may capture spatial information, such as X, Y, and Z coordinates for points in a view of the sensor devices. In some embodiments, the spatial information may be relative to a local coordinate system or may be relative to a global coordinate system (for example, a Cartesian coordinate system may have a fixed reference point, such as a fixed point on the earth, or may have a non-fixed local reference point, such as a sensor location).

In some embodiments, such sensors may also capture attribute information for one or more points, such as color attributes, reflectivity attributes, velocity attributes, acceleration attributes, time attributes, modalities, and/or various other attributes. In some embodiments, other sensors, in addition to LIDAR systems, 3-D cameras, 3-D scanners, etc., may capture attribute information to be included in a point cloud. For example, in some embodiments, a gyroscope or accelerometer, may capture motion information to be included in a point cloud as an attribute associated with one or more points of the point cloud. For example, a vehicle equipped with a LIDAR system, a 3-D camera, or a 3-D scanner may include the vehicle's direction and speed in a point cloud captured by the LIDAR system, the 3-D camera, or the 3-D scanner. For example, when points in a view of the vehicle are captured they may be included in a point cloud, wherein the point cloud includes the captured points and associated motion information corresponding to a state of the vehicle when the points were captured.

FIG. 1 illustrates a system comprising a sensor that captures information for points of a point cloud and an encoder that compresses attribute information of the point cloud, where the compressed attribute information is sent to a decoder, according to some embodiments.

System 100 includes sensor 102 and encoder 104. Sensor 102 captures a point cloud 110 comprising points representing structure 106 in view 108 of sensor 102. For example, in some embodiments, structure 106 may be a mountain range, a building, a sign, an environment surrounding a street, or any other type of structure. In some embodiments, a captured point cloud, such as captured point cloud 110, may include spatial and attribute information for the points included in the point cloud. For example, point A of captured point cloud 110 comprises X, Y, Z coordinates and attributes 1, 2, and 3. In some embodiments, attributes of a point may include attributes such as R, G, B color values, a velocity at the point, an acceleration at the point, a reflectance of the structure at the point, a time stamp indicating when the point was captured, a string-value indicating a modality when the point was captured, for example "walking", or other attributes. The captured point cloud 110 may be provided to encoder 104, wherein encoder 104 generates a compressed version of the point cloud (compressed attribute information 112) that is transmitted via network 114 to decoder 116. In some embodiments, a compressed version of the point cloud, such as compressed attribute information 112, may be included in a common compressed point cloud that also includes compressed spatial information for the points of the point cloud or, in some embodiments, compressed spatial information and compressed attribute information may be communicated as separate files.

In some embodiments, encoder 104 may be integrated with sensor 102. For example, encoder 104 may be implemented in hardware or software included in a sensor device, such as sensor 102. In other embodiments, encoder 104 may be implemented on a separate computing device that is proximate to sensor 102.

In some circumstances, the number of bits needed to encode attribute information comprises a significant portion of bit stream for a point cloud.

Figure 2:
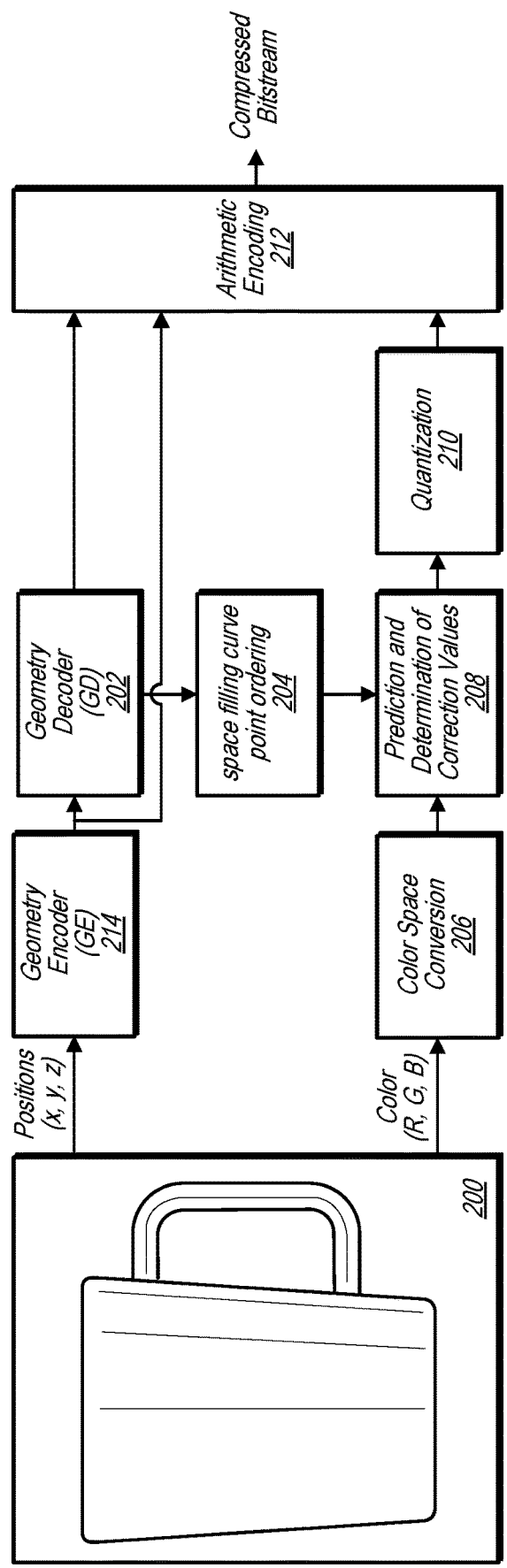
FIG. 2 illustrates an example encoder that predicts attributes for point cloud compression according to a space filling curve, according to some embodiments.

FIG. 2 illustrates an example encoder that predicts attributes for point cloud compression according to a space filling curve, according to some embodiments. For example, in some embodiments, an encoder such as encoder 104 in FIG. 1 may generate compressed attribute information using a similar process as shown in FIG. 2.

In some embodiments, geometry information (also referred to herein as "spatial information") may be used to efficiently predict attribute information. For example, in FIG. 2 the compression of color information is illustrated. However, in various other attributes in various combinations in addition to or instead of color may be predicted when compressing a point cloud, in some embodiments. For example, prediction of features like reflectance, texture, or modality associated with points of a point cloud may be performed as part of compressing the point cloud. Note that a pre-encoding step which applies color space conversion or updates the data to make the data better suited for compression may be performed depending on the attribute to be compressed, in some embodiments.

In some embodiments, attribute information compression using a space filling curve may be performed as described below. For example, let Geometry (G)={Point-P(0), P(1), . . . P(N−1)} be reconstructed point cloud positions generated by a spatial decoder included in an encoder (geometry decoder GD 202) after decoding a compressed geometry bit stream produced by a geometry encoder, also included in the encoder (geometry encoder GE 214), such as spatial encoder. For example, in some embodiments, an encoder such as encoder 202 may include both a geometry encoder, such as geometry encoder 214, and a geometry decoder, such as geometry decoder 214. In some embodiments, a geometry encoder may be part of spatial encoder and a geometry decoder may be part of prediction/correction evaluator.

In some embodiments, the decompressed spatial information may describe locations of points in 3D space, such as X, Y, and Z coordinates of the points that make up mug 200. Note that spatial information may be available to both an encoder, such as encoder 104, and a decoder, such as decoder 116. For example various techniques, such as K-D tree compression, octree compression, nearest neighbor prediction, etc., may be used to compress and/or encode spatial information for mug 200 and the spatial information may be sent to a decoder with, or in addition to, compressed attribute information for attributes of the points that make up a point cloud for mug 200.

In some embodiments, a deterministic re-ordering process may be applied on both an encoder side (such as at encoder 104) and at a decoder side (such as at decoder 116) in order to organize points of a point cloud, such as the points that represent mug 200, according to a space filling curve at space filling curve point ordering 204. For example, techniques to map positions (e.g., in X, Y, Z coordinate form) to a space filling curve such as a Morton-order (or Z-order), Halbert curve, Peano curve, and so on. The mapped positions for each point (e.g., the Morton codes generated for a respective position) may then be used to reorder, arrange, or otherwise sort the points according to their respective space filling curve values. The space filling curve point ordering may then be used to perform interpolation-based prediction, as discussed below and with regard to FIGS. 4A and 4B.

For example, in some embodiments attribute correction values for the points may be encoded in the space filling curve order generated at 204, as discussed below with regard to FIG. 4A. For example, the points may be processed by selecting a next point to interpolate according to the space filling curve order, determining a distance value between the selected point and a set of points ("s") that have been previously selected, interpolated, and/or encoded, selecting the K-nearest neighbors in set "s", and then predicting an attribute for the selected point according to the K-nearest neighbors (e.g., at interpolation-based prediction module 208).

In some embodiments, a set of points "s" may be a neighborhood of points within a neighborhood point count parameter of a given point being evaluated. For example, points at positions in the order according to the space filling curve that are within the neighborhood point count parameter in preceding positions, subsequent positions, or both in the order relative to the point being evaluated may be included in the set of points "s" of the neighborhood.

Points in the neighborhood may be candidate points to be evaluated to determine nearest neighboring points to be used in an inverse-distance based interpolation to predict attribute values for the given point being evaluated. For example, the "K" nearest neighboring points may be used in an inverse distance based interpolation, wherein the attribute values of the K nearest neighbors are weighted based on their respective distances from the given point being evaluated to predict an attribute value for the given point being evaluated. In an inverse-distance interpolation, attribute values for points that are closer to the given point being evaluated may be weighted more heavily than points that are further from the given point being evaluated. The "K" nearest neighboring points may be a sub-set of the points included in the neighborhood "s."

In some embodiments, determining a neighborhood "s" of candidate points to be evaluated to be included in the "K" nearest neighboring points may simplify the identification of the "K" nearest neighboring points and may further reduce complexity. For example, instead of an encoder or decoder having to determine Euclidean distances in 3D space between the given point being evaluated and all other points in the point cloud, the encoder or decoder only have to determine Euclidean distances for the points included in the neighborhood "s." Furthermore, ordering the points of the point cloud according to a space filling curve may be performed once for the point cloud as opposed to having to be repeated for each point being evaluated, as may be the case for determining Euclidean distances without using a neighborhood to limit the scope of candidates for inclusion in the "K" nearest neighboring points.

In some embodiments, an encoder or decoder may evaluate points as candidates for inclusion in the "K" nearest neighboring points used for inverse-distance based interpolation only from amongst the neighborhood "s" points determined based on the space filling curve.

In some embodiments, fewer than the "K" number of points may be used in an inverse distance based interpolation calculation. For example, in some embodiments, a maximum distance for nearest neighboring points may be signaled by an encoder and received by a decoder. As an example, if "K" is equal to ten but only eight points in the neighborhood are within the maximum distance from the given point being evaluated, the inverse distance based interpolation may be performed using eight nearest neighboring points instead of ten. In some embodiments, the maximum distance threshold may be a Euclidean distance in 3D space from any particular point being evaluated. It may be known by both an encoder and decoder, or may be signaled in the bitstream.

In some embodiments, points included in the "K" nearest points used for inverse-distance based interpolation may further be restricted to points in the neighborhood "s" that have attribute values that don't deviate from attribute values of other points in the neighborhood by more than a threshold amount. For example, points with outlier attribute values may be excluded from being used in the inverse-distance based interpolation to predict an attribute value for a given point. In such cases, an encoder and decoder may apply the same rules to exclude outlier points. Also, in some embodiments, points included in the "K" nearest neighboring points used for inverse-distance based interpolation may further be restricted to points in the neighborhood "s" that have similar surface characteristics as the given point being evaluated. For example, in some embodiments, points with surface normal vectors that deviate from surface normal vectors of other points in the neighborhood by more than a threshold amount may be excluded from being used in the inverse-distance based interpolation calculation to determine a predicated attribute value for a given point being evaluated.

In some embodiments, one or both of "s" and "K" may be parameters that can be defined by the encoder, a client application utilizing the encoder, or may be determined by using a dynamic technique that adapts one or both parameters (either at different times independently or together upon a triggering event for the parameters). For example, Rate Distortion Optimization (RDO) may be used to increase or decrease "s" and/or "K" values according to the quality indications of the point cloud that may be determined using RDO.

Different events may trigger the adjustment or change of "s" and/or "K", in some embodiments. For example, quality criteria or thresholds, like RDO, may be used to detect changes in the quality of the point cloud data in order to adjust how strong or weak interpolation is applied. For example, a point cloud may be one of a series of point clouds (e.g., received as frames in a point cloud video or as a sequence of point cloud pictures). As the tolerance for diction indicated by RDO changes adjustments to one or both parameters may be performed. In another example, a complexity budget for a point cloud (or portion thereof) could be used (e.g., a complexity budget for a sequence of points or point cloud pictures/frames, a group of point cloud frames/pictures, a region of a point cloud, etc.). Trigger events may occur at different frequencies (e.g., updating, if needed, for each new sequence, group of pictures (GOP), picture, or new region, slice, or tile within a point cloud).

In some embodiments, one or more of the parameters "s" and "K" may be adjusted based on the position and/or attributes of the points in "s". For example, if the distance values are above a threshold amount then they may not be considered for "K" even if that results in fewer than "K" points being used for attribute prediction. In some scenarios, a minimum number of points less than "K" could be selected, even if they exceed the distance threshold (e.g., selecting the single closest point). In some scenarios, "s" could be increased. In another example of adjusting parameters based on the position and/or attributes, could be utilizing normals to the surface. In another example, a K-nearest neighbor above a threshold distance value could be replaced with one or more points in "s" that have more similar attribute values (even if further in distance).

As discussed below with regard to FIG. 3, "s" and "K" may be included in the bit stream as part of Compressed Attribute File information 300, in some embodiments.

In some embodiments, different prediction strategies may be used. For example, one of the following interpolation strategies may be used, as well as combinations of the following interpolation strategies, or an encoder/decoder may adaptively switch between the different interpolation strategies. The different interpolation strategies may include interpolation strategies such as: inverse-distance interpolation, barycentric interpolation, natural neighbor interpolation, moving least squares interpolation, or other suitable interpolation techniques. For example, interpolation based prediction may be performed at an interpolation-based prediction module 208 included in a prediction/correction value evaluator of an encoder, such as prediction/correction value evaluator of encoder 104. Also, interpolation based prediction may be performed at an interpolation-based prediction module 208 included in a prediction evaluator of a decoder, such as a prediction evaluator of decoder 116.

In some embodiments (not illustrated), a machine learning model could be used to interpolate or otherwise predict attribute values for a selected by applying a machine learning technique to the set "s" of points with respect to the select point, instead of using the K-nearest neighbors. For example, supervised learning techniques, such as linear regression, logistic regression, may be applied to predict (e.g., the model) for one or more attributes of a selected point given the attribute(s) of the set of "s" points.

In some embodiments (not illustrated), the space filling curve ordering of points may be utilized to select points in one or more level of detail (LOD) structures for encoding or analyzing a point cloud. For example, the set "s" for one or more selected points may be used to generate a level of detail, with the size of "s" increase to increase the level of detail generated, in some embodiments.

In some embodiments, a color space may also be converted, at color space conversion module 206, prior to performing interpolation based prediction 208. In some embodiments, a color space conversion module 206 may be included in an encoder, such as encoder 202. In some embodiments, a decoder may further included a module to convert a converted color space, back to an original color space. Furthermore, attribute correction values may be determined based on comparing the interpolation-based prediction values determined at interpolation-based prediction module 208 to original non-compressed attribute values.

In some embodiments, an encoder as described above may further include a quantization module (not shown) that quantizes geometry information included in the "positions (x,y,z) being provided to the geometry encoder 214. Furthermore, in some embodiments, an encoder as described above may additionally include a module that removes duplicated points subsequent to quantization and before the geometry encoder 214.

In some embodiments, quantization may further be applied to compressed attribute information, such as attribute correction values and/or one or more attribute value starting points. For example quantization is performed at 210 to attribute correction values determined by interpolation-based prediction module 208. Quantization techniques may include uniform quantization, uniform quantization with a dead zone, non-uniform/non-linear quantization, trellis quantization, or other suitable quantization techniques. The quantitated attribute correction values, encoded spatial information (output from the geometry encoder 214) and any configuration parameters used in the prediction may be encoded at arithmetic encoding module 212. In some embodiments, the arithmetic encoding module, may use a context adaptive arithmetic encoding technique. The compressed point cloud may then be provided to a decoder, such as decoder 116, and the decoder may determine similar levels of detail and perform interpolation based prediction to recreate the original point cloud based on the quantized attribute correction values, encoded spatial information (output from the geometry encoder 214) and the configuration parameters used in the prediction at the encoder.

Figure 3:
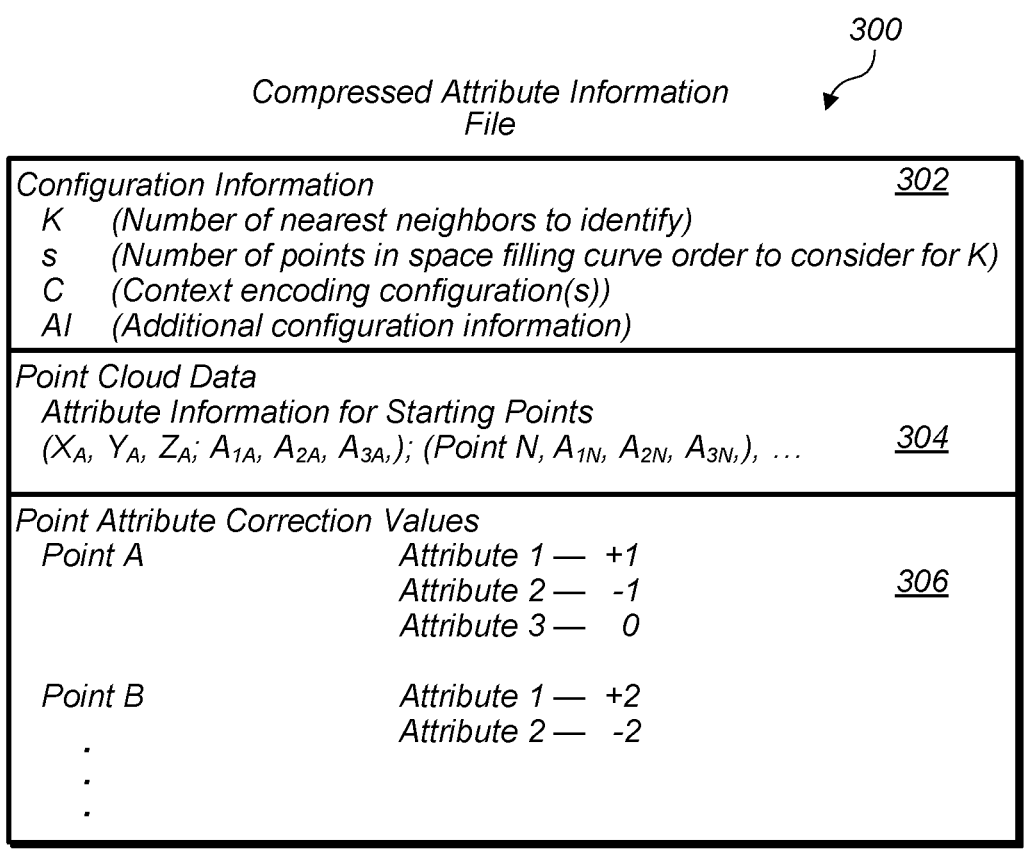
FIG. 3 illustrates an example compressed point cloud file, according to some embodiments.

FIG. 3 illustrates an example compressed point cloud file, according to some embodiments. Level of detail attribute information file 300 includes configuration information 302, point cloud data 304, and level of detail point attribute correction values 306. In some embodiments, level of detail attribute information file 300 may be communicated in parts via multiple packets. In some embodiments, not all of the sections shown in the level of detail attribute information file 300 may be included in each packet transmitting compressed attribute information. In some embodiments, a level of detail attribute information file, such as level of detail attribute information file 300, may be stored in a storage device, such as a server that implements an encoder or decoder, or other computing device.

Figure 4A:
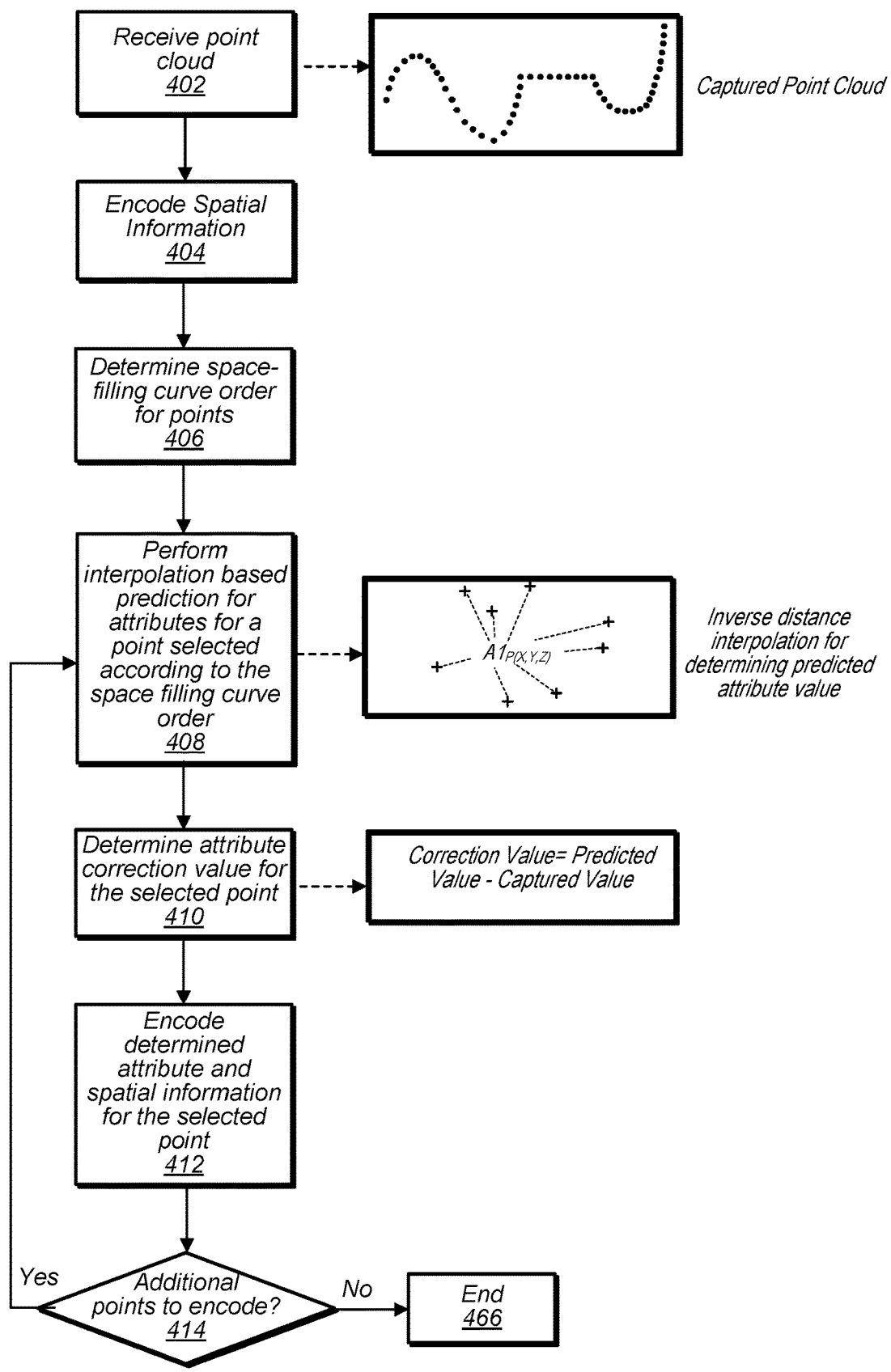
FIG. 4A illustrates a method of encoding attribute information of a point cloud using a space filling curve, according to some embodiments.

FIG. 4A illustrates a method of encoding attribute information of a point cloud using a space filling curve, according to some embodiments.

At 402, a point cloud may be received by an encoder, in some embodiments. The point cloud may be captured, for example by one or more sensors, or may be generated, for example in software.

At 404, spatial or geometry information of the point cloud may be encoded as discussed above, in some embodiments. For example, the spatial information may be encoded using K-D trees, Octrees, a neighbor prediction strategy, or other suitable technique to encode the spatial information.

At 406, a space filling curve order for points in the captured point cloud may be determined, in some embodiments. For example, a Morton code may be generated according to the X, Y, and Z coordinate values for each point in a capture point cloud, in one embodiment. Then, the points may be sorted according to their respective Morton code values. In some embodiments, the sorted order of the points according to the space filling curve may then be used for selecting which point to predict attributes for next and which other points should be considered for use in making the prediction (e.g., "s" points with Morton code values prior to the selected value (e.g., points that have already been encoded)).

At 408, an interpolation based prediction may be performed to predict attribute values for the attributes of the points of the point cloud. For example, as discussed above, inverse-distance interpolation, barycentric interpolation, natural neighbor interpolation, moving least squares interpolation, or other suitable interpolation techniques may be used. In some embodiments, which interpolation prediction technique used may be dynamically selected (e.g., per sequence, group of pictures (GOP), picture, or new region, slice, or tile within a point cloud). Also as discussed above, the candidate points to be evaluated for use in the interpolation based prediction may be restricted to the neighborhood points "s" determined based on the order according to the space filling curve.

At 410, attribute correction values are determined based on comparing the predicted attribute values to original attribute values. For example, in some embodiments, an interpolation based prediction may be performed for each selected point according to the order of the space filling curve. These predicted attribute values may then be compared to attribute values of the original point cloud prior to compression to determine attribute correction values for the selected point.

At 412, attribute correction values, encoded spatial information (output from the geometry encoder) and any configuration parameters used in the prediction are encoded, as described herein.

As indicated at 414, another point may be selected at 408 according to the space filling curve ordering so that elements 408, 410, and 412 are performed until all points have been encoded after which selection of points is at an end, as indicated at 466.

In some embodiments, an encoder may further encode one or more configuration parameters to be sent to a decoder, such as any of the configuration parameters shown in configuration information 302 of compressed attribute information file 300.

Figure 4B:
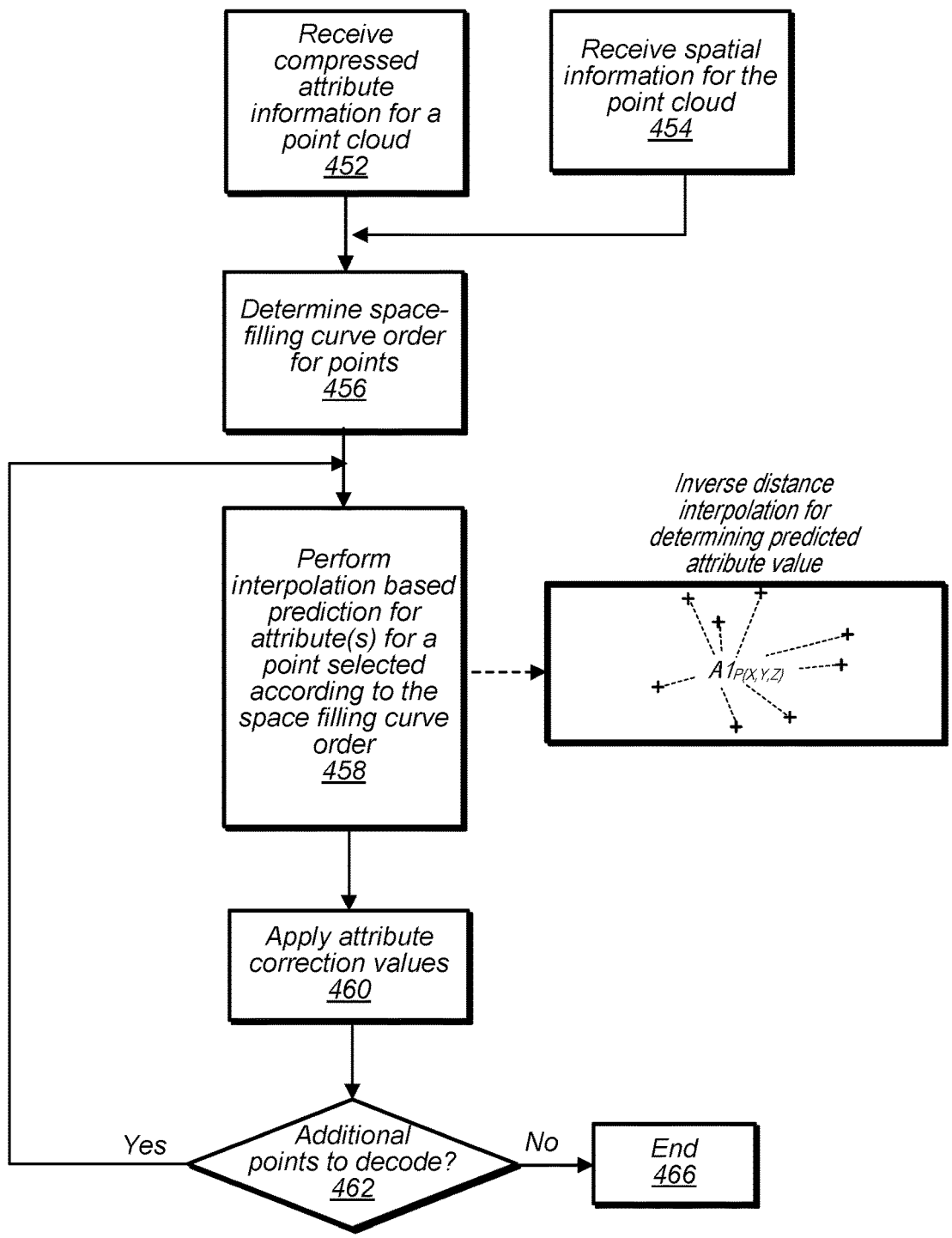
FIG. 4B illustrates a method of decoding attribute information of a point cloud using a space filling curve, according to some embodiments.

FIG. 4B illustrates a method of decoding attribute information of a point cloud using a space filling curve, according to some embodiments.

At 452, compressed attribute information for a point cloud is received at a decoder. Also, at 454 spatial information for the point cloud is received at the decoder. In some embodiments, the spatial information may be compressed or encoded using various techniques, such as a K-D tree, Octree, neighbor prediction, etc. and the decoder may decompress and/or decode the received spatial information at 454.

At 456, the decoder may determine the space filling curve order for points, in some embodiments. For example, For example, a Morton code may be generated according to the X, Y, and Z coordinate values for each point in a capture point cloud, in one embodiment. Then, the points may be sorted according to their respective Morton code values. In some embodiments, the sorted order of the points according to the space filling curve may then be used for selecting which point to predict attributes for next and which other points should be considered for use in making the prediction (e.g., "s" points with Morton code values prior to the selected value (e.g., points that have already been encoded)) when decoding at 458.

At 458 interpolation based prediction for attribute(s) for a point selected according to the space filling curve may be performed, as described herein. Similar to the discussion above, inverse-distance interpolation, barycentric interpolation, natural neighbor interpolation, moving least squares interpolation, or other suitable interpolation techniques may be used and may be indicated in additional configuration in order to apply the same interpolation technique as performed at the encoder, in some embodiments. Also similar to the discussion above, the candidate points to be evaluated for use in the inverse distance based interpolation may be restricted to points in the neighborhood "s" for a point being evaluated, wherein the neighborhood "s" is determined based on the space filling curve order.

At 460, in some embodiments, attribute correction values received in a compressed attribute information file (e.g., 300 in FIG. 3), may be applied to the predicted attributes at 458. At 462 it is determined if there are additional points to decode. If so, the process returns to 458 and is repeated for the next point in the space filling curve order to decode. If not the process is stopped at 466, in some embodiments.

In some embodiments the spatial information described above may be encoded and decoded via a geometry encoder and arithmetic encoder, such as geometry encoder 202 and arithmetic encoder 212 described above in regard to FIG. 2. In some embodiments, a geometry encoder, such as geometry encoder 202 may utilize an octree compression technique and arithmetic encoder 212 may be a binary arithmetic encoder as described in more detail below.

The use of a binary arithmetic encoder as described below reduces the computational complexity of encoding octree occupancy symbols as compared to a multi-symbol codec with an alphabet of 256 symbols (e.g. 8 sub-cubes per cube, and each sub-cube occupied or un-occupied 2^8=256). Also the use of context selection based on most probable neighbor configurations may reduce a search for neighbor configurations, as compared to searching all possible neighbor configurations.

In some embodiments, an arithmetic encoder, such as arithmetic encoder 212, may use a binary arithmetic codec to encode the 256-value occupancy symbols. This may be less complex and more hardware friendly in terms of implementation as compared to a multi-symbol arithmetic codec. Additionally, an arithmetic encoder 212 and/or geometry encoder 202 may utilizes a look-ahead procedure to compute the 6-neighbors used for arithmetic context selection, which may be less complex than a linear search and may involve a constant number of operations (as compared to a linear search which may involve varying numbers of operations). Additionally, the arithmetic encoder 212 and/or geometry encoder 202 may utilize a context selection procedure, which reduces the number of encoding contexts. In some embodiments, a binary arithmetic codec, look-ahead procedure, and context selection procedure may be implemented together or independently.

Figure 5:
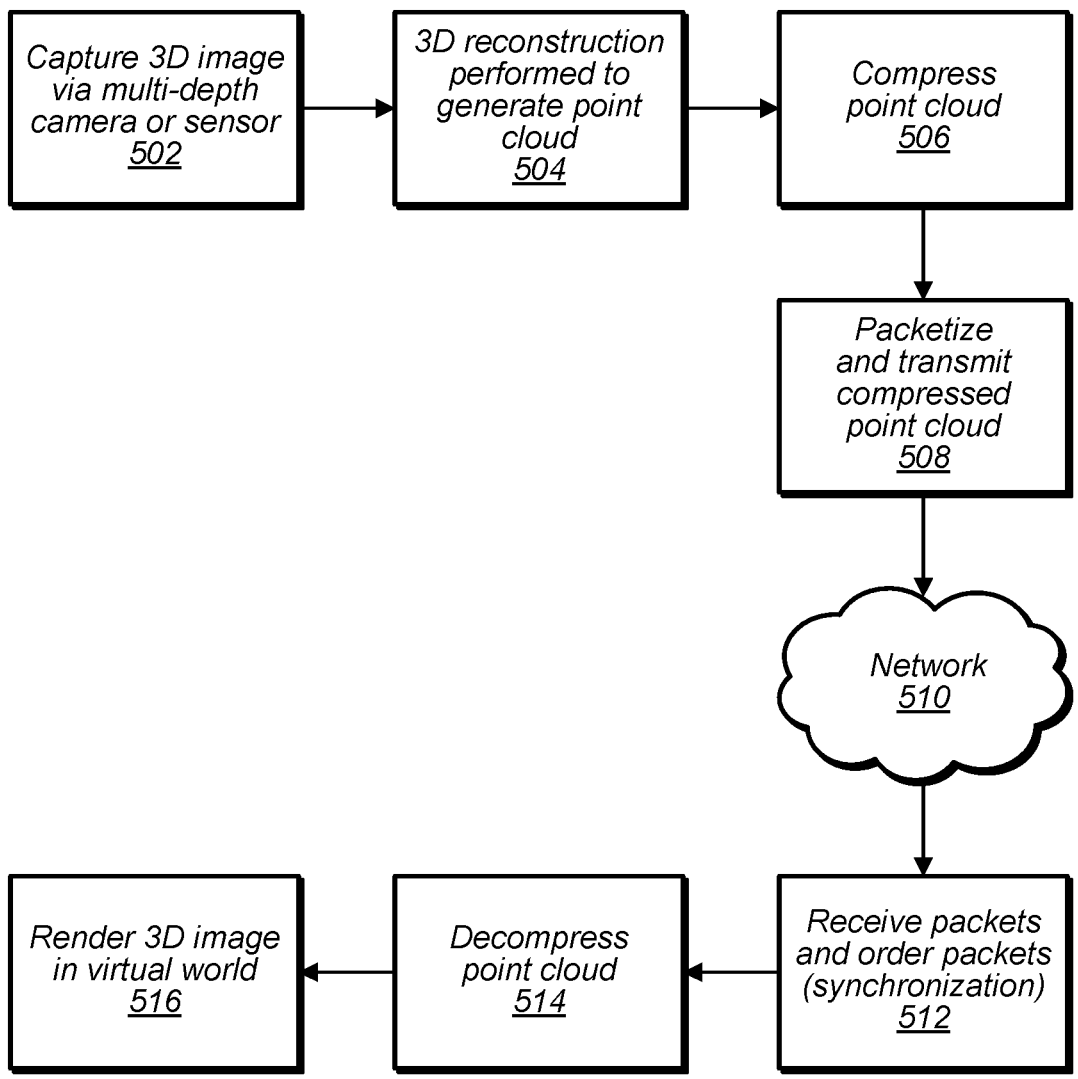
FIG. 5 illustrates compressed point cloud information being used in a 3-D application, according to some embodiments.

FIG. 5 illustrates compressed point clouds being used in a 3-D application, according to some embodiments.

In some embodiments, a sensor, such as sensor 102, an encoder, such as encoder 104, and a decoder, such as decoder 116, may be used to communicate point clouds in a 3-D application. For example, a sensor, such as sensor 102, at 502 may capture a 3D image and at 504, the sensor or a processor associated with the sensor may perform a 3D reconstruction based on sensed data to generate a point cloud.

At 506, an encoder such as encoder 104 may compress the point cloud and at 508 the encoder or a post processor may packetize and transmit the compressed point cloud, via a network 510. At 512, the packets may be received at a destination location that includes a decoder, such as decoder 116. The decoder may decompress the point cloud at 514 and the decompressed point cloud may be rendered at 516. In some embodiments a 3-D application may transmit point cloud data in real time such that a display at 516 represents images being observed at 502. For example, a camera in a canyon may allow a remote user to experience walking through a virtual canyon at 516.

Figure 6:
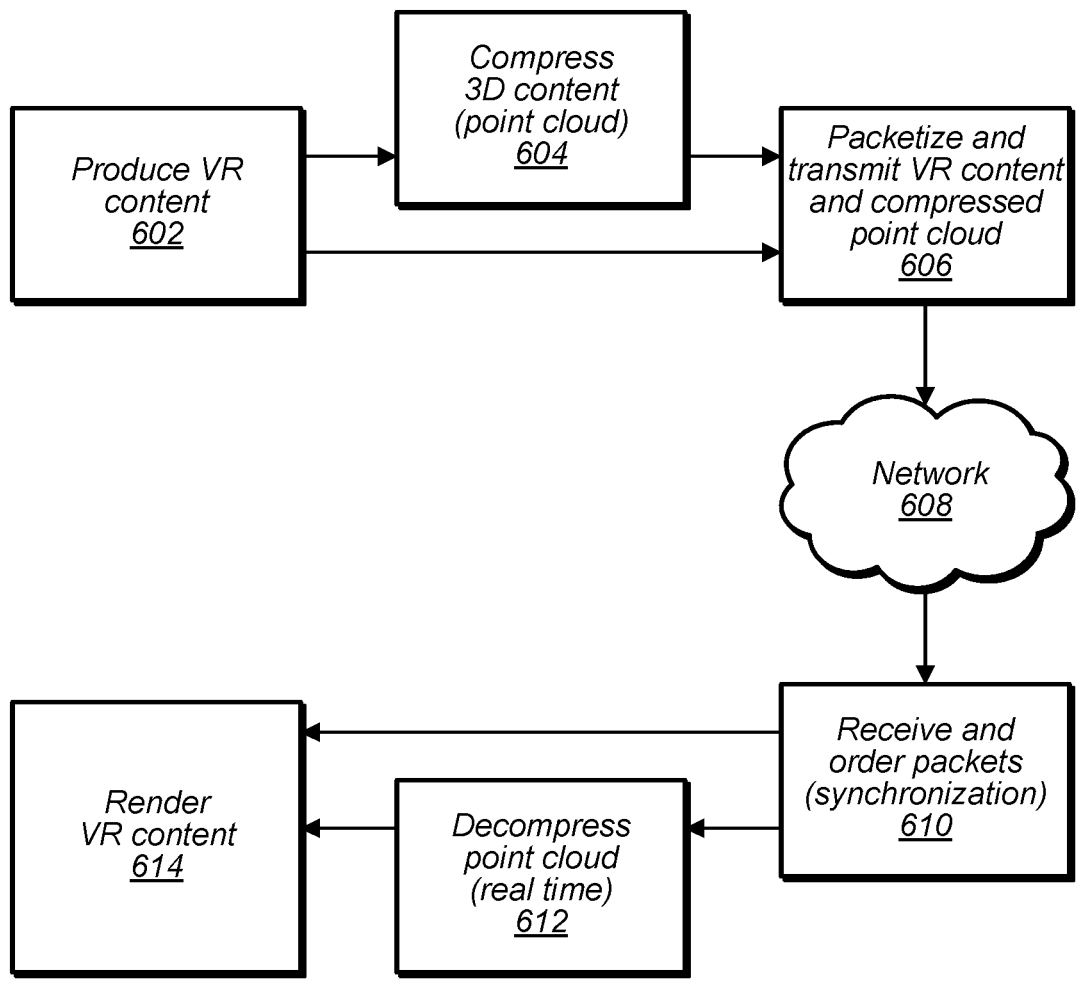
FIG. 6 illustrates compressed point cloud information being used in a virtual reality application, according to some embodiments.

FIG. 6 illustrates compressed point clouds being used in a virtual reality (VR) or augmented reality (AR) application, according to some embodiments.

In some embodiments, point clouds may be generated in software (for example as opposed to being captured by a sensor). For example, at 602 virtual reality or augmented reality content is produced. The virtual reality or augmented reality content may include point cloud data and non-point cloud data. For example, a non-point cloud character may traverse a landscape represented by point clouds, as one example. At 604, the point cloud data may be compressed and at 606 the compressed point cloud data and non-point cloud data may be packetized and transmitted via a network 608. For example, the virtual reality or augmented reality content produced at 602 may be produced at a remote server and communicated to a VR or AR content consumer via network 608. At 610, the packets may be received and synchronized at the VR or AR consumer's device. A decoder operating at the VR or AR consumer's device may decompress the compressed point cloud at 612 and the point cloud and non-point cloud data may be rendered in real time, for example in a head mounted display of the VR or AR consumer's device. In some embodiments, point cloud data may be generated, compressed, decompressed, and rendered responsive to the VR or AR consumer manipulating the head mounted display to look in different directions.

In some embodiments, point cloud compression as described herein may be used in various other applications, such as geographic information systems, sports replay broadcasting, museum displays, autonomous navigation, etc.

Example Computer System

Figure 7:
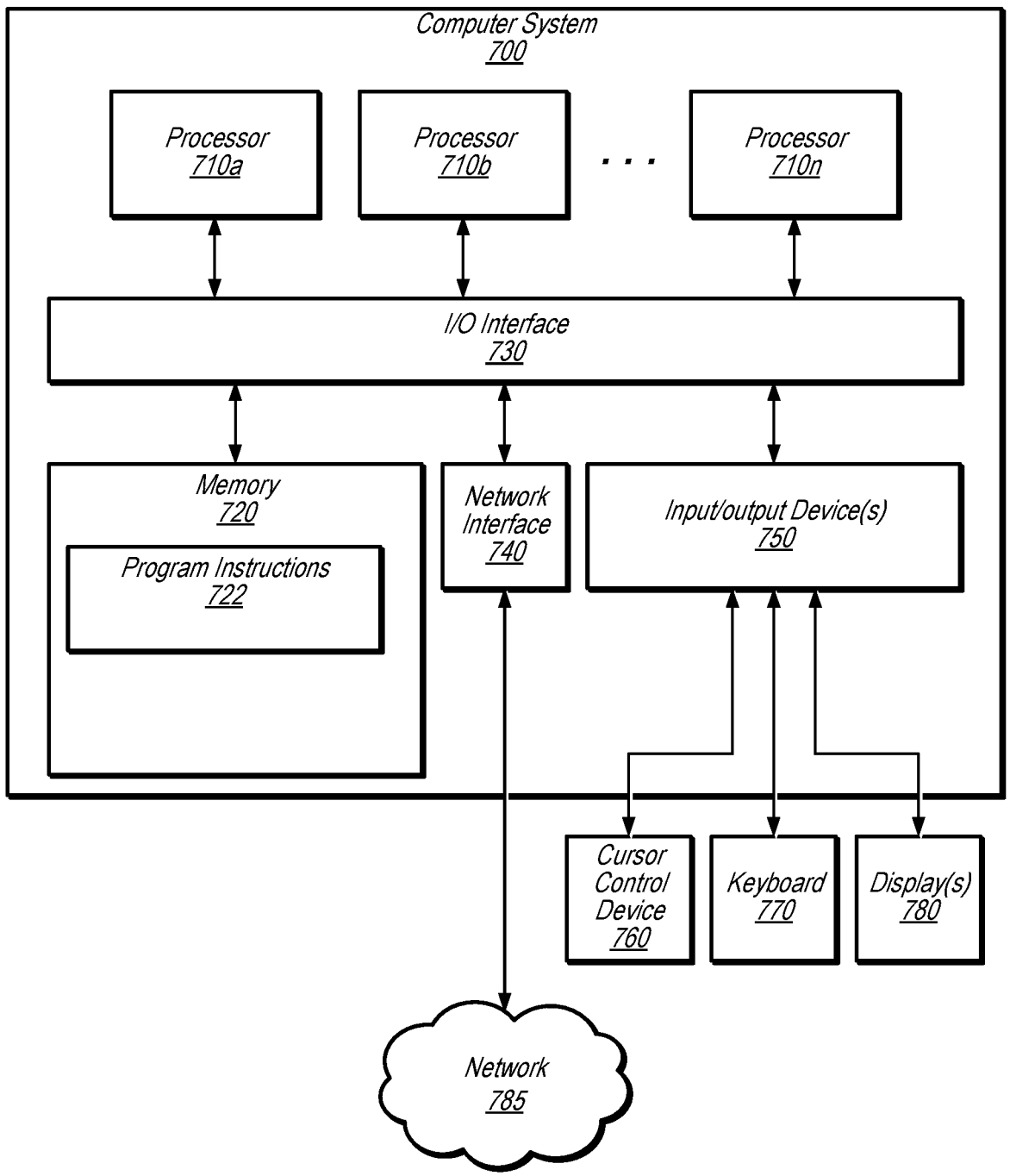
FIG. 7 illustrates an example computer system that may implement an encoder or decoder, according to some embodiments.

FIG. 7 illustrates an example computer system 700 that may implement an encoder or decoder or any other ones of the components described herein, (e.g., any of the components described above with reference to FIGS. 1-6), in accordance with some embodiments. The computer system 700 may be configured to execute any or all of the embodiments described above. In different embodiments, computer system 700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a point cloud encoder or decoder, as described herein may be executed in one or more computer systems 700, which may interact with various other devices. Note that any component, action, or functionality described above with respect to FIGS. 1-6 may be implemented on one or more computers configured as computer system 700 of FIG. 7, according to various embodiments. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store point cloud compression or point cloud decompression program instructions 722 and/or sensor data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions 722 may be configured to implement an image sensor control application incorporating any of the functionality described above. In some embodiments, program instructions and/or data may be received, sent or stored upon different types of computer-accessible media or on similar media separate from system memory 720 or computer system 700. While computer system 700 is described as implementing the functionality of functional blocks of previous Figures, any of the functionality described herein may be implemented via such a computer system.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network 785 (e.g., carrier or agent devices) or between nodes of computer system 700. Network 785 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 722, which may be processor-executable to implement any element or action described above. In one embodiment, the program instructions may implement the methods described above. In other embodiments, different elements and data may be included. Note that data may include any data or information described above.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A non-transitory computer-readable medium storing program instructions that, when executed by one or more processors, cause the one or more processors to:
   compress attribute values for points of a three-dimensional point cloud, wherein to compress the attribute values, the program instructions cause the one or more processors to:
      determine an order for the points of the three-dimensional point cloud according to a space filling curve applied to spatial information of the points of the three-dimensional point cloud; and
      evaluate the points of the three-dimensional point cloud to determine attribute correction values, wherein for a given point being evaluated, the program instructions cause the one or more processors to:
         determine a set of neighborhood points for the given point being evaluated based on the determined order for the points according to the space filling curve, wherein the set of neighborhood points comprises a number of points included in the order at preceding or subsequent positions in the order that precede or follow the given point being evaluated;
         determine from the set of neighborhood points, a sub-set of the neighborhood points that are nearest in location in three-dimensional space to the given point being evaluated;
         predict an attribute value for the given point being evaluated based on respective attribute values of points included in the sub-set of the neighborhood points that are nearest to the given point being evaluated; and
         determine an attribute correction value for the given point being evaluated based on comparing the predicted attribute value for the given point to an attribute value for the given point included in the three-dimensional point cloud prior to compression.

2. The non-transitory computer-readable medium of claim 1, wherein to determine the sub-set of points of the neighborhood points that are nearest in location in three-dimensional space to the given point being evaluated, the program instructions cause the one or more processors to:
   evaluate points as candidates for being included in the sub-set of nearest points to the given point being evaluated from only among the set of neighborhood points determined for the given point being evaluated.

3. The non-transitory computer-readable medium of claim 1, wherein the program instructions cause the one or more processors to:
   remove one or more points as candidates for being included in the sub-set of nearest points to the given point being evaluated, based on the one or more points having attribute values that vary from attribute values other points in the neighborhood by more than one or more threshold values.

4. The non-transitory computer-readable medium of claim 1, wherein the program instructions cause the one or more processors to:
   remove one or more points from being considered as candidates for being included in the sub-set of nearest points to the given point being evaluated, based on the one or more points having surface normal vectors that vary from surface normal vectors for other points in the neighborhood by more than one or more threshold values.

5. The non-transitory computer-readable medium of claim 1, wherein the program instructions cause the one or more processors to:
   encode the determined attribute correction values;
   signal a neighborhood point count parameter indicating a number of neighborhood points to be included in the set of neighborhood points; and
   signal a nearest neighbor point count parameter indicating a number of nearest neighboring points to be included in the sub-set of nearest neighboring points.

6. The non-transitory computer-readable medium of claim 5, wherein to determine the set of neighborhood points for the given point being evaluated, the program instructions cause the one or more processors to:
   identify a number of points in the order at preceding or subsequent positions in the order equal to the neighborhood point count parameter.

7. The non-transitory computer-readable medium of claim 6, wherein to determine from the set of neighborhood points, a sub-set of the neighborhood points that are nearest in location in three-dimensional space to the given point being evaluated, the program instructions cause the one or more processors to:
   identify a number of nearest neighboring points equal to the nearest neighbor point count parameter, wherein a nearest neighbor point count is less than a neighborhood point count.

8. The non-transitory computer-readable medium of claim 7, wherein:
   the neighborhood point count parameter and the nearest neighbor point count parameter are configurable parameters selected by a user or designer of a codec comprising the program instructions.

9. The non-transitory computer-readable medium of claim 7, wherein to determine from the set of neighborhood points, a sub-set of the neighborhood points that are nearest in location in three-dimensional space to the given point being evaluated, the program instructions cause the one or more processors to:
   limit the nearest neighboring points to points located within a threshold Euclidian distance of the given point being evaluated.

10. A non-transitory computer-readable medium storing program instructions that, when executed by one or more processors, cause the one or more processors to:
    receive spatial information for a plurality of points of a point cloud and receive attribute correction values for the plurality of points of the point cloud;
    determine an order for the plurality of points of the point cloud according to a space filling curve applied to the spatial information for the points of the point cloud; and evaluate the points of the point cloud to determine decompressed attribute values for the points of the point cloud, wherein for a given point being evaluated, the program instructions cause the one or more processors to:
  determine a set of neighborhood points for the given point being evaluated based on the determined order, wherein the set of neighborhood points comprises a number of points included in the order at preceding or subsequent positions in the order that precede or follow the given point being evaluated;
  determine from the set of neighborhood points, a sub-set of the neighborhood points that are nearest in location in three-dimensional space to the given point being evaluated;
  predict an attribute value for the given point being evaluated based on respective attribute values of points included in the sub-set of the neighborhood points that are nearest to the given point being evaluated; and
  apply an attribute correction value for the given point being evaluated to the predicted attribute value to determine a decompressed attribute value for the given point being evaluated.

11. The non-transitory computer-readable medium of claim 10, wherein to determine the sub-set of points of the neighborhood points that are nearest in location in three-dimensional space to the given point being evaluated, the program instructions cause the one or more processors to:
  evaluate points as candidates for being included in the sub-set of nearest points to the given point being evaluated from only among the set of neighborhood points determined for the given point being evaluated.

12. The non-transitory computer-readable medium of claim 10, wherein the attribute correction values for the plurality of points of the point cloud are included in an encoded bitstream, and wherein the encoded bitstream further comprises:
  a neighborhood point count parameter indicating a number of neighborhood points to be included in the set of neighborhood points; and
  a nearest neighbor point count parameter indicating a number of nearest neighboring points to be included in the sub-set of nearest neighboring points.

13. The non-transitory computer-readable medium of claim 10, wherein the space filling curve is a Morton space filing curve and the order for the plurality of points of the point cloud according to the space filling curve is a Morton order.

14. The non-transitory computer-readable medium of claim 10, wherein to predict an attribute value for the given point being evaluated based on respective attribute values of points included in the sub-set of the neighborhood points that are nearest to the given point being evaluated, the program instructions cause the one or more processors to:
  perform an inverse-distance weighted interpolation between the given point being evaluated and each of the points included in the sub-set of nearest neighboring points, wherein attribute values of points closer to the given point being evaluated are weighted greater than attribute values of points that are further from the given point being evaluated.

15. A device, comprising:
a memory storing program instructions; and
one or more processors, wherein the program instructions, when executed by the one or more processors, cause the one or more processors to:
  determine an order for a plurality of points of a three-dimensional point cloud according to a space filling curve applied to spatial information of the points; and
  evaluate the points of the three-dimensional point cloud to determine attribute correction values for a compressed version of the point cloud, wherein for a given point being evaluated, the program instructions cause the one or more processors to:
    determine a set of neighborhood points for the given point being evaluated based on the determined order, wherein the set of neighborhood points comprises a number of points included in the order at preceding or subsequent positions in the order that precede or follow the given point being evaluated;
    determine from the set of neighborhood points, a sub-set of the neighborhood points that are nearest in location to the given point being evaluated;
    predict an attribute value for the given point being evaluated based on respective attribute values of points included in the sub-set of the neighborhood points that are nearest to the given point being evaluated; and
    determine an attribute correction value for the given point being evaluated based on comparing the predicted attribute value for the given point to an attribute value for the given point included in the three-dimensional point cloud prior to compression.

16. The device of claim 15, wherein the program instructions further cause the one or more processors to:
  encode the determined attribute correction values;
  signal a neighborhood point count parameter indicating a number of neighborhood points to be included in the set of neighborhood points; and
  signal a nearest neighbor point count parameter indicating a number of nearest neighboring points to be included in the sub-set of nearest neighboring points.

17. The device of claim 16, wherein the neighborhood point count parameter and the nearest neighbor point count parameter are signaled at:
  a sequence level for a sequence comprising a plurality of versions of the point cloud at a plurality of moment in time; or
  an individual point cloud level for a specific version of the point cloud at a particular moment in time.

18. The device of claim 17, wherein:
for a given portion of the point cloud:
  a portion specific neighborhood point count parameter is signaled; or
  a portion specific nearest neighbor point count parameter is signaled.

19. The device of claim 18, wherein the program instructions cause the one or more processors to adaptively adjust:
  the portion specific neighborhood point count; or
  the portion specific nearest neighbor point count parameter,
  based on an overall complexity budget for compressing the point cloud.

20. The device of claim 18, wherein the program instructions cause the one or more processors to adaptively adjust:
 the portion specific neighborhood point count; or
 the portion specific nearest neighbor point count parameter,
 based on a rate distortion optimization (RDO) calculation.

\* \* \* \* \*